(12) United States Patent
Liu et al.

(10) Patent No.: US 11,053,864 B2
(45) Date of Patent: Jul. 6, 2021

(54) CONTROL STRATEGY, APPARATUS AND NONVOLATILE COMPUTER STORAGE MEDIUM

(71) Applicant: GREAT WALL MOTOR COMPANY LIMITED, Hebei (CN)

(72) Inventors: Tao Liu, Baoding (CN); Liming Xu, Baoding (CN); Fabao Yang, Baoding (CN); Ji Yin, Baoding (CN); Jiajia Hu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 37 days.

(21) Appl. No.: 16/620,611

(22) PCT Filed: Jun. 7, 2018

(86) PCT No.: PCT/CN2018/090303
§ 371 (c)(1),
(2) Date: Dec. 9, 2019

(87) PCT Pub. No.: WO2018/224019
PCT Pub. Date: Dec. 13, 2018

(65) Prior Publication Data
US 2021/0131359 A1 May 6, 2021

(30) Foreign Application Priority Data

Jun. 9, 2017 (CN) .......................... 201710434182.7

(51) Int. Cl.
*F02D 13/00* (2006.01)
*F02D 13/04* (2006.01)
(Continued)

(52) U.S. Cl.
CPC ................ *F02D 13/04* (2013.01); *F01L 1/22* (2013.01); *F01L 13/0015* (2013.01);
(Continued)

(58) Field of Classification Search
CPC ...... F02D 13/04; F02D 41/06; F02D 41/0002; F02D 41/2438; F02D 41/10; F02D 41/12;
(Continued)

(56) References Cited

PUBLICATIONS

International Search Report dated Aug. 10, 2018 in corresponding International application No. PCT/CN2018/090303; 4 pages.

*Primary Examiner* — Hai H Huynh
(74) *Attorney, Agent, or Firm* — Maier & Maier, PLLC

(57) ABSTRACT

A control strategy includes: after an engine is energized, the continuously variable valve lift mechanism self learning to determine a current position; if the self learning is successful, the continuously variable valve lift mechanism being located at a maximum lift position, preparing for starting the engine, and determining a regulating mode based on a starting temperature, wherein at the time of normal temperature start, regulation is performed from the maximum lift position to a minimum lift position, and at the time of low temperature start, regulation is performed from the maximum lift position to a position where the two valves for the same cylinder have a maximum lift difference; if the self learning fails, entering a preliminary start mode; entering a CVVL control mode based on an operation condition of the engine; and powering off the engine.

20 Claims, 3 Drawing Sheets

(51) Int. Cl.
   *F02D 41/00* (2006.01)
   *F02D 41/10* (2006.01)
   *F02D 41/12* (2006.01)
   *F02D 41/06* (2006.01)
   *F01L 13/00* (2006.01)
   *F01L 1/22* (2006.01)
   *F02D 41/04* (2006.01)
   *F02D 41/24* (2006.01)
   *F01L 1/46* (2006.01)
   *F02D 13/02* (2006.01)
   *F01L 1/18* (2006.01)

(52) U.S. Cl.
   CPC ...... *F01L 13/0021* (2013.01); *F02D 41/0002* (2013.01); *F02D 41/045* (2013.01); *F02D 41/06* (2013.01); *F02D 41/10* (2013.01); *F02D 41/12* (2013.01); *F02D 41/2438* (2013.01); *F01L 1/181* (2013.01); *F01L 1/462* (2013.01); *F01L 2305/00* (2020.05); *F02D 2013/0292* (2013.01); *F02D 2013/0296* (2013.01); *F02D 2200/021* (2013.01)

(58) Field of Classification Search
   CPC ........... F02D 41/045; F02D 2013/0296; F02D 2013/0292; F02D 2200/021; F01L 1/22; F01L 1/181; F01L 1/462; F01L 13/0015; F01L 13/0021; F01L 2305/00
   USPC ................. 123/90.11, 90.15, 90.19; 701/103
   See application file for complete search history.

CONTROL STRATEGY, APPARATUS AND NONVOLATILE COMPUTER STORAGE MEDIUM

CROSS-REFERENCE TO RELATED APPLICATION

The present application claims priority to Chinese Patent Application Serial No. 201710434182.7, entitled "Control Strategy for Continuously Variable Valve Lift Mechanism", filed by the Great Wall Motor Company Limited on Jun. 9, 2017.

FIELD

The present application relates to a control strategy for a continuously variable valve lift mechanism, an apparatus and a nonvolatile computer storage medium.

BACKGROUND

With the increasingly serious environmental problem, low emission and environmental protection have become preconditions for an engine to enter the market. A load of the traditional gasoline engine is changed by changing a throttle valve to regulate air inflow. Under a small load condition, the throttle valve has a small opening, there exists a quite large vacuum degree behind the throttle valve, and a pumping loss is great in the process of breathing of the engine, which is an important reason why the gasoline engine works less efficiently than a diesel engine. To increase the efficiency of the engine, a continuously variable valve lift technology is proposed. In the related art, the consistency of lifts of valves is affected inevitably due to a machining tolerance of components and parts in a system. Further, a lift difference value is generated due to a fit clearance of the system and deformation of each of the components and parts, such that a certain deviation is present between the practical efficiency and a design target of the continuously variable valve lift technology.

SUMMARY

In view of this, a first aspect of the present application is intended to propose a control strategy for a continuously variable valve lift mechanism to improve low temperature start.

To achieve the above-mentioned objective, the present application provides the technical solution as follows.

A control strategy for a continuously variable valve lift mechanism is disclosed, and two valves of the continuously variable valve lift mechanism for the same cylinder correspond to eccentric wheels with different profiles, and the control strategy includes: after an engine is energized, the continuously variable valve lift mechanism self learning to determine a current position; if the self learning is successful, the continuously variable valve lift mechanism being located at a maximum lift position, preparing for starting the engine, and determining a regulating mode based on a starting temperature, wherein at the time of normal temperature start, regulation is performed from the maximum lift position to a minimum lift position, and at the time of low temperature start, regulation is performed from the maximum lift position to a position where the two valves for the same cylinder have a maximum lift difference; if the self learning fails, entering a preliminary start mode; entering a CVVL control mode based on an operation condition of the engine; and powering off the engine.

Further, the step of the continuously variable valve lift mechanism beginning the self learning to determine the current position includes: sending an instruction by a control unit to move from an initial position to the minimum lift position and then to the maximum lift position.

Further, the continuously variable valve lift mechanism is configured such that at the maximum lift position, a resultant force of a roller assembly of the continuously variable valve lift mechanism on the eccentric wheel has a direction passing through an axis of an eccentric shaft, so as to self lock the continuously variable valve lift mechanism at the maximum lift position after the self learning is successful.

Further, the preliminary start mode includes: detecting a position of the eccentric shaft; calculating a current lift value by the control unit; and starting the engine in conjunction with an opening of a throttle valve corresponding to the lift value.

Further, the preliminary start mode further includes: after the engine is started, the continuously variable valve lift mechanism performing maximum lift self learning.

Further, the step of entering the CVVL control mode based on the operation condition of the engine includes: under an accelerating condition, increasing a lift; under a decelerating condition, based on a load, regulating the lift to the minimum lift position corresponding to the current load; under a brake condition, regulating the lift to be maximum, and closing the throttle valve; and under an idling condition, regulating the lift to be minimum.

Further, under the accelerating condition, the lift is increased to a position close to 90% of the maximum lift, and then regulated gradually to a position close to the maximum lift.

Further, after the step of powering off the engine, the control strategy further includes: before flameout, the continuously variable valve lift mechanism learning to the minimum lift position; when the engine is shut down, the continuously variable valve lift mechanism learning to the maximum lift position; and when the maximum lift is reached, self locking the continuously variable valve lift mechanism.

Compared with the related art, the control strategy of the continuously variable valve lift mechanism according to the present application has the following advantages.

1) With the control strategy for the continuously variable valve lift mechanism according to the embodiments of the present application, by regulating the lift difference of the valves for the same cylinder to be maximum, two air flows at different flow velocities enter a combustion chamber to form an eddy, which facilitates rapid and adequate mixing of fuel gas, such that the low temperature start may be improved effectively. Further, with improvement of the asynchronous lifts of the two valves for the same cylinder on combustion, combustion at the medium or small load is more adequate.

A second aspect of the present application is intended to propose an apparatus, including one or a plurality of processors, a memory, and one or a plurality of programs stored in the memory. When executed by the one or the plurality of processors, the one or the plurality of programs execute the above-mentioned control strategy for the continuously variable valve lift mechanism according to the present application.

A third aspect of the present application is intended to propose a nonvolatile computer storage medium which stores one or a plurality of programs, and when executed by one apparatus, the one or the plurality of programs enable the above-mentioned apparatus according to the present application to execute the above-mentioned control strategy for the continuously variable valve lift mechanism according to the present application.

The technical effects of the apparatus and the nonvolatile computer storage medium according to the present application are the same as the technical effects of the control strategy for the continuously variable valve lift mechanism according to the present application, which will not be repeated herein.

BRIEF DESCRIPTION OF THE DRAWINGS

The accompanying drawings which constitute a part of the present application serve to provide a further understanding of the present application, and exemplary embodiments of the present application and explanation thereof are used for interpreting the present application, without limiting the present application improperly. In the drawings.

Figure 1:
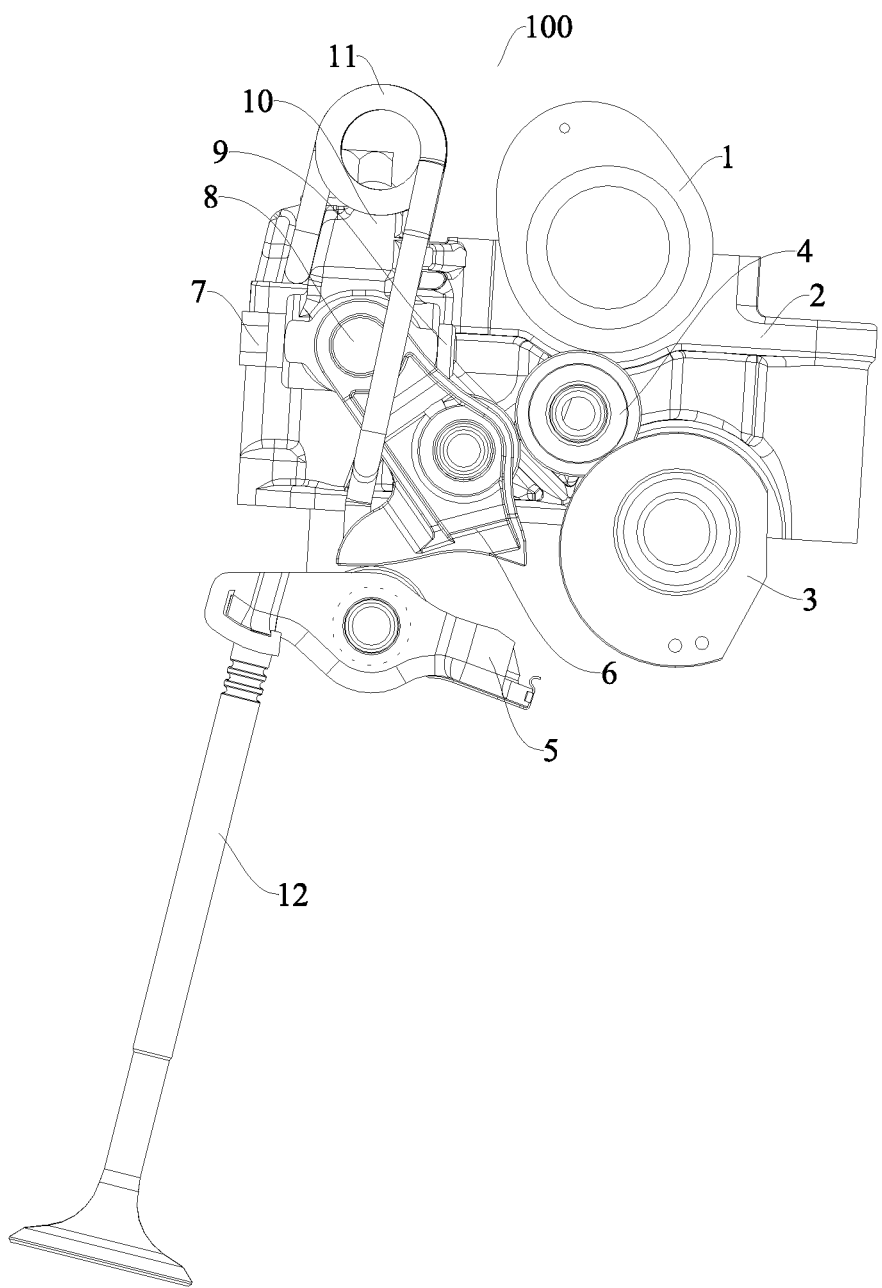
FIG. 1 is a schematic structural diagram of a continuously variable valve lift mechanism according to an embodiment of the present application.
Figure 2:
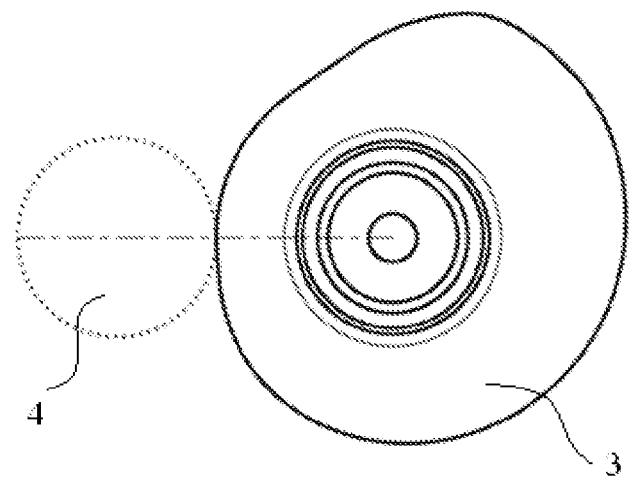
FIG. 2 is a schematic structural diagram of an eccentric shaft at a minimum lift position according to an embodiment of the present application.

REFERENCE NUMERALS continuously variable valve lift mechanism 100; camshaft 1; supporting base 2; eccentric shaft 3; roller assembly 4; roller rocker 5; intermediate swing arm 6; outer regulating screw 7; intermediate swing arm pin shaft 8; inner regulating screw 9; fixed support 10; returning spring 11; valve 12.

DETAILED DESCRIPTION

It should be noted that the embodiments in the present application and features therein may be combined mutually in the case of no conflicts.

The present application will be described in detail below with reference to the drawings in conjunction with the embodiments.

As shown in FIG. 1, a continuously variable valve lift mechanism 100 may include a camshaft 1, a supporting base 2, an eccentric shaft 3, a roller assembly 4, a roller rocker 5, an intermediate swing arm 6, an outer regulating screw 7, an intermediate swing arm pin shaft 8, an inner regulating screw 9, a fixed support 10, a returning spring 11, a valve 12, a locating sleeve, a locating pin, a small camshaft cover, a cylinder head and an eccentric shaft driving device.

The camshaft 1, the eccentric shaft 3 and the fixed support 10 are all mounted on the supporting base 2, the camshaft 1 and the eccentric shaft 3 may rotate freely, and the supporting base 2 is mounted on the cylinder head.

The camshaft 1 is connected with a crankshaft of an engine, for example, by chain transmission. The camshaft 1 rotates to drive the roller assembly 4, a roller of the intermediate swing arm 6 is in close contact with the roller assembly 4 by means of the returning spring 11, the roller assembly 4 transmits movement to the intermediate swing arm 6, and the intermediate swing arm 6 drives the roller rocker 5, thereby opening or closing the valve 12.

The eccentric shaft driving device is coupled to the eccentric shaft 3 dynamically, so as to control the eccentric shaft 3 to rotate clockwise or anticlockwise. The eccentric shaft driving device may be configured as a control electric motor, and an output shaft of the control motor may be configured as a worm. The eccentric shaft 3 may be fixedly connected with a worm gear, and the worm is engaged with the worm gear, such that the control electric motor is coupled to the eccentric shaft 3 dynamically.

The eccentric shaft 3 is fixedly connected with an eccentric wheel, and when the eccentric shaft 3 rotates, the eccentric wheel of the eccentric shaft 3 drives the roller assembly 4 to change a contact point between the roller assembly 4 and the roller of the intermediate swing arm 6, thereby regulating a lift and an opening duration of the valve.

The intermediate swing arm 6 is mounted on the fixed support by means of the intermediate swing arm pin shaft 8, and the position of the intermediate swing arm pin shaft 8 may be fixed or regulated by the outer regulating screw 7 and the inner regulating screw 9, and the position of the intermediate swing arm pin shaft 8 can be changed by rotating the outer regulating screw 7 or the inner regulating screw 9, thereby regulating a center of rotation of the intermediate swing arm 6. Two intermediate swing arms 6 may be mounted on each fixed support 10, and the fixed support 6 is mounted on the supporting base 2.

The control strategy for the continuously variable valve lift mechanism 100 according to the embodiment of the present application will be described below.

The two valves 12 of the continuously variable valve lift mechanism 100 for the same cylinder correspond to the eccentric wheels with different profiles. That is, the two valves 12 for the same cylinder may have the lifts which are not synchronous completely.

Figure 4:
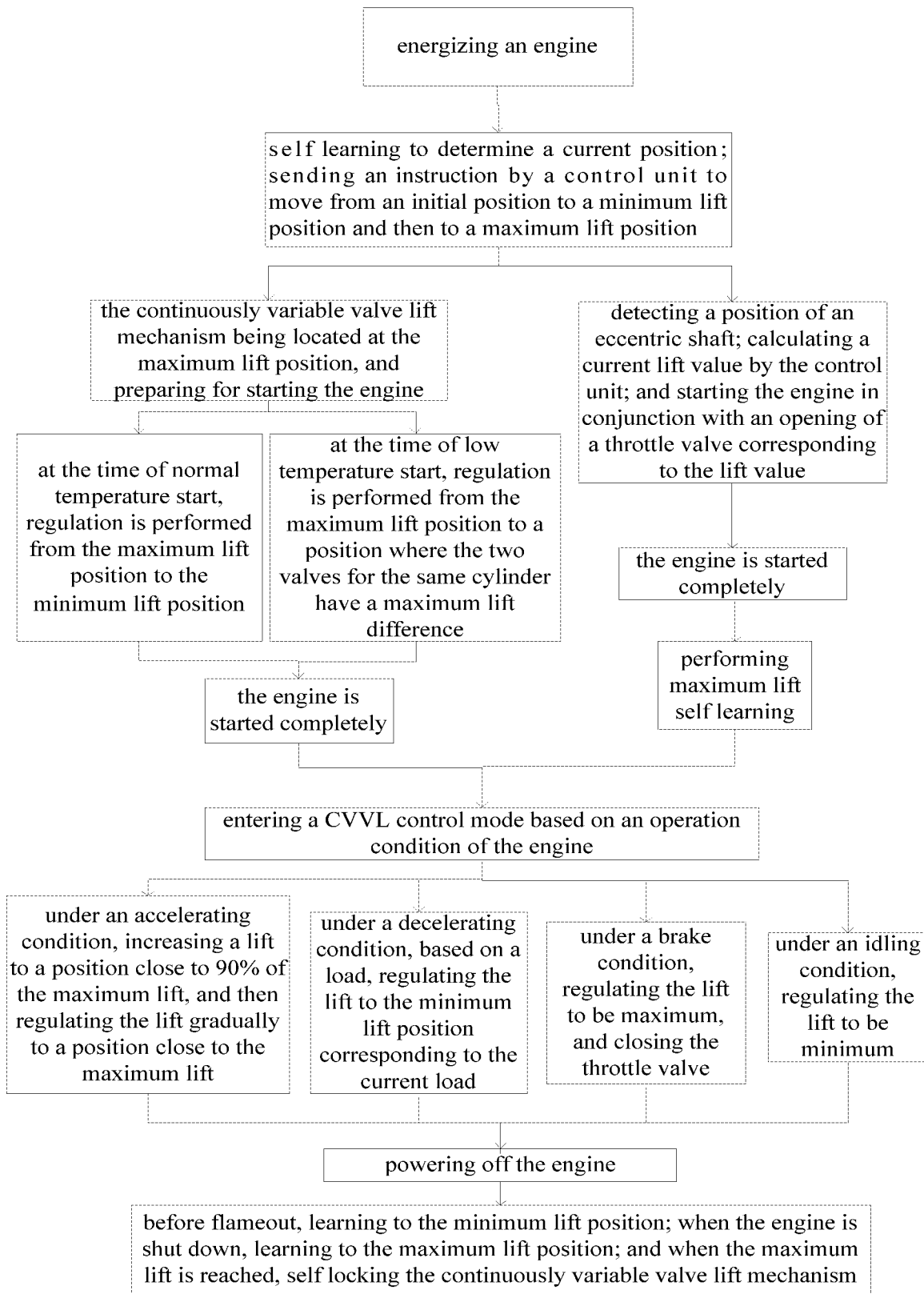
FIG. 4 is a flow chart of a control strategy according to an embodiment of the present application.

As shown in FIG. 4, the control strategy includes: after the engine is energized, the continuously variable valve lift mechanism 100 self learning to determine a current position. The step of the continuously variable valve lift mechanism 100 beginning the self learning to determine the current position includes: sending an instruction by a control unit to move the control electric motor from an initial position to the minimum lift position and then to the maximum lift position. In this way, the control unit may calculate the current position of the eccentric shaft 3 based on a lift sensor (electric motor position sensor).

Figure 3:
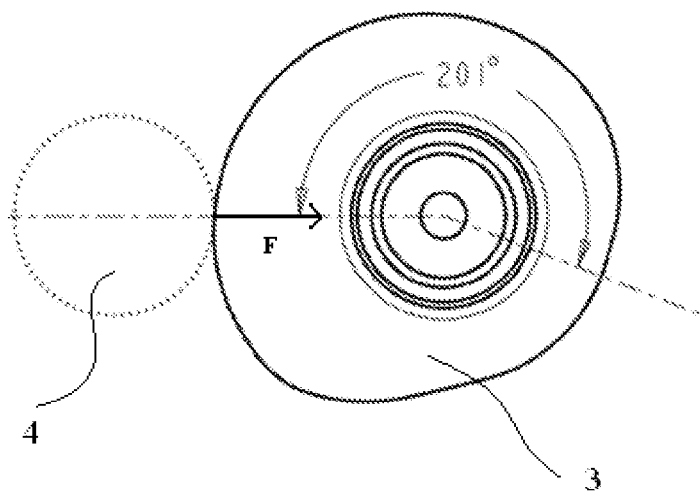
FIG. 3 is a schematic structural diagram of the eccentric shaft at a maximum lift position according to an embodiment of the present application.

If the self learning is successful, the continuously variable valve lift mechanism 100 is located at the maximum lift position and prepares for starting the engine. Specifically, as shown in FIG. 3, the continuously variable valve lift mechanism 100 is configured such that at the maximum lift position, a resultant force F of the roller assembly of the continuously variable valve lift mechanism 100 on the eccentric wheel has a direction passing through an axis of the eccentric shaft 3, so as to self lock the continuously variable valve lift mechanism 100 at the maximum lift position after the self learning is successful. A pressure angle is greater than a friction angle of the profile of the eccentric wheel at the maximum lift, and the resultant force of the roller assembly on the eccentric wheel has a direction passing through the axis of the eccentric shaft 3, thus the eccentric wheel and the roller assembly are self locked.

At this point, the regulating mode of the eccentric shaft 3 may be determined based on a starting temperature. At the time of normal temperature start, the control electric motor is regulated from the maximum lift position to the minimum lift position, and at the time of low temperature start, the control electric motor is regulated from the maximum lift position to a position where the two valves for the same cylinder have a maximum lift difference.

It will be appreciated that when the lift difference of the valves for the same cylinder is regulated to be maximum, two air flows at different flow velocities enter a combustion chamber to form an eddy, which facilitates rapid and adequate mixing of fuel gas, such that the low temperature start may be improved effectively. Further, with improvement of the asynchronous lifts of the two valves of the same cylinder on combustion, combustion at a medium or small load is more adequate.

If the self learning fails, a preliminary start mode is entered.

Specifically, the preliminary start mode includes: detecting the position of the eccentric shaft 3; calculating a current lift value by the control unit; and starting the engine in conjunction with an opening of a throttle valve corresponding to the lift value. The preliminary start mode further includes: after the engine is started, the continuously variable valve lift mechanism 100 performing maximum lift self learning.

In this way, even if the self learning fails, starting of the engine is not affected, and by means of self regulation, the continuously variable valve lift mechanism 100 may work normally after the engine is started.

If the self learning is successful, after the engine is started completely, a CVVL control mode is entered based on an operation condition of the engine, and if the self learning fails, after the continuously variable valve lift mechanism 100 performs the maximum lift self learning, the CVVL control mode is entered based on the operation condition of the engine.

Specifically, the step of entering the CVVL control mode based on the operation condition of the engine includes: under an accelerating condition, increasing the lift (for example, under the accelerating condition, the lift is increased to a position close to 90% of the maximum lift, and then gradually regulated to a position close to the maximum lift, in which the lift is rapidly increased to the position near 90% of the maximum lift in an earlier stage, and gently regulated to the position near the maximum lift, so as to mitigate an impact); under a decelerating condition, based on the load, regulating the lift to the minimum lift position corresponding to the current load; under a brake condition, regulating the lift to be maximum, and closing the throttle valve; and under an idling condition, regulating the lift to be minimum.

The engine is powered off.

After the step of powering off the engine, the control strategy may further include: before flameout, the continuously variable valve lift mechanism 100 learning to the minimum lift position; when the engine is shut down, the continuously variable valve lift mechanism 100 learning to the maximum lift position; and when the maximum lift is reached, self locking the continuously variable valve lift mechanism 100, so as to facilitate the next start.

In conclusion, according to the control strategy for the continuously variable valve lift mechanism 100, the lift value of the valve of each cylinder is detected and fed back by the lift sensor, in conjunction with different current operation conditions of the engine, such as starting, accelerating, decelerating, braking, idling, or the like, the lift of the valve is regulated, such that the valve lift is changed continuously under most of the operation conditions of the engine, and optimal valve lift matching is guaranteed. Particularly, the low temperature start may be improved effectively.

The apparatus according to the present application will be described below.

The apparatus includes one or a plurality of processors, a memory, and one or a plurality of programs stored in the memory. When executed by the one or the plurality of processors, the one or the plurality of programs execute the above-mentioned control strategy for the continuously variable valve lift mechanism 100 according to any of the embodiments of the present application.

The technical effects of the apparatus according to the present application are the same as the technical effects of the control strategy for the continuously variable valve lift mechanism 100 according to the present application, which will not be repeated herein.

The nonvolatile computer storage medium according to the present application will be described below.

The nonvolatile computer storage medium stores one or a plurality of programs. When executed by one apparatus, the one or the plurality of programs enable the above-mentioned apparatus according to the present application to execute the above-mentioned control strategy for the continuously variable valve lift mechanism 100 according to any of the embodiments of the present application.

The technical effects of the nonvolatile computer storage medium according to the present application are the same as the technical effects of the control strategy for the continuously variable valve lift mechanism 100 according to the present application, which will not be repeated herein.

The above are merely the preferred embodiments of the present application and shall not be used to limit the present application. Any modifications, equivalents and improvements made within the spirit and principle of the present application shall fall within the protection scope of the present application.

What is claimed is:

1. A control strategy for a continuously variable valve lift mechanism, wherein two valves of the continuously variable valve lift mechanism for the same cylinder correspond to eccentric wheels with different profiles, and the control strategy comprises:

after an engine is energized, the continuously variable valve lift mechanism self learning to determine a current position;

if the self learning is successful, the continuously variable valve lift mechanism being located at a maximum lift position, preparing for starting the engine, and determining a regulating mode based on a starting temperature, wherein at the time of normal temperature start, regulation is performed from the maximum lift position to a minimum lift position, and at the time of low temperature start, regulation is performed from the maximum lift position to a position where the two valves for the same cylinder have a maximum lift difference;

if the self learning fails, entering a preliminary start mode;

entering a CVVL control mode based on an operation condition of the engine; and powering off the engine.

2. The control strategy according to claim 1, wherein the step of the continuously variable valve lift mechanism beginning the self learning to determine the current position comprises:

sending an instruction by a control unit to move from an initial position to the minimum lift position and then to the maximum lift position.

3. The control strategy according to claim 2, wherein the continuously variable valve lift mechanism is configured such that at the maximum lift position, a resultant force of a roller assembly of the continuously variable valve lift mechanism on the eccentric wheel has a direction passing through an axis of an eccentric shaft, so as to self lock the continuously variable valve lift mechanism at the maximum lift position after the self learning is successful.

4. The control strategy according to claim 2, wherein the preliminary start mode comprises: detecting a position of the eccentric shaft; calculating a current lift value by the control unit; and starting the engine in conjunction with an opening of a throttle valve corresponding to the lift value.

5. The control strategy according to claim 2, wherein the step of entering the CVVL control mode based on the operation condition of the engine comprises:
   under an accelerating condition, increasing a lift;
   under a decelerating condition, based on a load, regulating the lift to a minimum lift position corresponding to the current load;
   under a brake condition, regulating the lift to be maximum, and closing a throttle valve; and
   under an idling condition, regulating the lift to be minimum.

6. The control strategy according to claim 2, after the step of powering off the engine, further comprising:
   before flameout, the continuously variable valve lift mechanism learning to the minimum lift position; when the engine is shut down, the continuously variable valve lift mechanism learning to the maximum lift position; and when the maximum lift is reached, self locking the continuously variable valve lift mechanism.

7. The control strategy according to claim 1, wherein the continuously variable valve lift mechanism is configured such that at the maximum lift position, a resultant force of a roller assembly of the continuously variable valve lift mechanism on the eccentric wheel has a direction passing through an axis of an eccentric shaft, so as to self lock the continuously variable valve lift mechanism at the maximum lift position after the self learning is successful.

8. The control strategy according to claim 7, wherein the preliminary start mode comprises: detecting a position of the eccentric shaft; calculating a current lift value by the control unit; and starting the engine in conjunction with an opening of a throttle valve corresponding to the lift value.

9. The control strategy according to claim 7, wherein the step of entering the CVVL control mode based on the operation condition of the engine comprises:
   under an accelerating condition, increasing a lift;
   under a decelerating condition, based on a load, regulating the lift to a minimum lift position corresponding to the current load;
   under a brake condition, regulating the lift to be maximum, and closing a throttle valve; and
   under an idling condition, regulating the lift to be minimum.

10. The control strategy according to claim 7, after the step of powering off the engine, further comprising:
    before flameout, the continuously variable valve lift mechanism learning to the minimum lift position; when the engine is shut down, the continuously variable valve lift mechanism learning to the maximum lift position; and when the maximum lift is reached, self locking the continuously variable valve lift mechanism.

11. The control strategy according to claim 1, wherein the preliminary start mode comprises: detecting a position of the eccentric shaft; calculating a current lift value by the control unit; and starting the engine in conjunction with an opening of a throttle valve corresponding to the lift value.

12. The control strategy according to claim 11, wherein the step of entering the CVVL control mode based on the operation condition of the engine comprises:
    under an accelerating condition, increasing a lift;
    under a decelerating condition, based on a load, regulating the lift to a minimum lift position corresponding to the current load;
    under a brake condition, regulating the lift to be maximum, and closing a throttle valve; and
    under an idling condition, regulating the lift to be minimum.

13. The control strategy according to claim 11, after the step of powering off the engine, further comprising:
    before flameout, the continuously variable valve lift mechanism learning to the minimum lift position; when the engine is shut down, the continuously variable valve lift mechanism learning to the maximum lift position; and when the maximum lift is reached, self locking the continuously variable valve lift mechanism.

14. The control strategy according to claim 11, wherein the preliminary start mode further comprises: after the engine is started, the continuously variable valve lift mechanism performing maximum lift self learning.

15. The control strategy according to claim 14, wherein the step of entering the CVVL control mode based on the operation condition of the engine comprises:
    under an accelerating condition, increasing a lift;
    under a decelerating condition, based on a load, regulating the lift to a minimum lift position corresponding to the current load;
    under a brake condition, regulating the lift to be maximum, and closing a throttle valve; and
    under an idling condition, regulating the lift to be minimum.

16. The control strategy according to claim 1, wherein the step of entering the CVVL control mode based on the operation condition of the engine comprises:
    under an accelerating condition, increasing a lift;
    under a decelerating condition, based on a load, regulating the lift to a minimum lift position corresponding to the current load;
    under a brake condition, regulating the lift to be maximum, and closing a throttle valve; and
    under an idling condition, regulating the lift to be minimum.

17. The control strategy according to claim 16, wherein under the accelerating condition, the lift is increased to a position close to 90% of the maximum lift, and then regulated gradually to a position close to the maximum lift.

18. The control strategy according to claim 1, after the step of powering off the engine, further comprising:
    before flameout, the continuously variable valve lift mechanism learning to the minimum lift position; when the engine is shut down, the continuously variable valve lift mechanism learning to the maximum lift position; and when the maximum lift is reached, self locking the continuously variable valve lift mechanism.

19. An apparatus, comprising:
    one or a plurality of processors;
    a memory; and
    one or a plurality of programs stored in the memory, when executed by the one or the plurality of processors, the one or the plurality of programs executing a control strategy for a continuously variable valve lift mechanism, wherein two valves of the continuously variable valve lift mechanism for the same cylinder correspond to eccentric wheels with different profiles, and the control strategy comprises:

after an engine is energized, the continuously variable valve lift mechanism self learning to determine a current position;

if the self learning is successful, the continuously variable valve lift mechanism being located at a maximum lift position, preparing for starting the engine, and determining a regulating mode based on a starting temperature, wherein at the time of normal temperature start, regulation is performed from the maximum lift position to a minimum lift position, and at the time of low temperature start, regulation is performed from the maximum lift position to a position where the two valves for the same cylinder have a maximum lift difference;

if the self learning fails, entering a preliminary start mode;

entering a CVVL control mode based on an operation condition of the engine; and powering off the engine.

20. A nonvolatile computer storage medium configured to store one or a plurality of programs, wherein when executed by one apparatus comprising one or a plurality of processors, the one or the plurality of programs enable the apparatus to execute a control strategy for a continuously variable valve lift mechanism, wherein two valves of the continuously variable valve lift mechanism for the same cylinder correspond to eccentric wheels with different profiles, and the control strategy comprises:

after an engine is energized, the continuously variable valve lift mechanism self learning to determine a current position;

if the self learning is successful, the continuously variable valve lift mechanism being located at a maximum lift position, preparing for starting the engine, and determining a regulating mode based on a starting temperature, wherein at the time of normal temperature start, regulation is performed from the maximum lift position to a minimum lift position, and at the time of low temperature start, regulation is performed from the maximum lift position to a position where the two valves for the same cylinder have a maximum lift difference;

if the self learning fails, entering a preliminary start mode;

entering a CVVL control mode based on an operation condition of the engine; and powering off the engine.

* * * * *